(12) United States Patent
Seenappa et al.

(10) Patent No.: US 10,579,093 B2
(45) Date of Patent: Mar. 3, 2020

(54) WORKLOAD PREDICTION BASED CPU FREQUENCY SCALING

(71) Applicant: AT&T Intellectual Property I, L.P., Atlanta, GA (US)

(72) Inventors: Vikram Seenappa, Sammamish, WA (US); Vivek Mhatre, Bellevue, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 83 days.

(21) Appl. No.: 15/909,083

(22) Filed: Mar. 1, 2018

(65) Prior Publication Data

US 2019/0272002 A1 Sep. 5, 2019

(51) Int. Cl.
*G06F 1/08* (2006.01)
*G06F 1/32* (2019.01)
*G06F 9/455* (2018.01)
*G06F 1/324* (2019.01)

(52) U.S. Cl.
CPC .............. *G06F 1/08* (2013.01); *G06F 1/324* (2013.01); *G06F 9/45558* (2013.01); *G06F 2009/45595* (2013.01)

(58) Field of Classification Search
CPC ......... G06F 1/08; G06F 1/324; G06F 9/45558
See application file for complete search history.

(56) References Cited

U.S. PATENT DOCUMENTS

| | | | |
|---|---|---|---|
| 8,650,423 B2 | 2/2014 | Li et al. | |
| 9,229,711 B2 | 1/2016 | Arasaratnam | |
| 9,436,263 B2 | 9/2016 | Venumuddala et al. | |
| 9,459,679 B2 | 10/2016 | Burchard et al. | |
| 9,501,115 B2 | 11/2016 | Mandagere et al. | |
| 9,519,562 B2 | 12/2016 | Isci et al. | |
| 9,588,578 B2 | 3/2017 | Park et al. | |
| 9,690,485 B2 | 6/2017 | Byrd et al. | |
| 9,696,786 B2 | 7/2017 | Panda et al. | |
| 9,703,591 B2 | 7/2017 | Shimogawa | |
| 9,811,388 B2 | 11/2017 | Shah et al. | |
| 2012/0209568 A1 | 8/2012 | Arndt et al. | |
| 2016/0320825 A1* | 11/2016 | Panda | G06F 1/3206 |
| 2017/0075733 A1 | 3/2017 | Kannan | |
| 2018/0121222 A1* | 5/2018 | Sharma | G06F 9/45558 |
| 2019/0086984 A1* | 3/2019 | Yoon | G06F 1/3206 |

* cited by examiner

*Primary Examiner* — Stefan Stoynov
(74) *Attorney, Agent, or Firm* — BakerHostetler

(57) ABSTRACT

A method comprises predicting, based on corresponding historical workload data, a change in virtual network function demand during a future workload period, wherein the virtual network function is supported by a node. The method further comprises determining a target clock speed of one or more physical CPU cores of one or more processors of one or more servers in the node corresponding to the change in the virtual network function demand and adjusting the CPU CORE of the node to the target clock speed corresponding to the change in the virtual network function demand for the future workload period.

19 Claims, 10 Drawing Sheets

WORKLOAD PREDICTION BASED CPU FREQUENCY SCALING

TECHNICAL FIELD

This disclosure relates generally to network management and, more specifically, to network design and capacity planning.

BACKGROUND

To provide a service or application (generally "an application") using virtualized network platforms, a set of one or more virtual network functions (VNFs) may be instantiated on dedicated or shared hardware. For example, a VNF may be a firewall, cache, gateway, intrusion detection system, or the like. Each VNF may require one or more virtual machines (VMs) to be instantiated. In turn, VMs may require various resources, such as memory, virtual computer processing units (vCPUs), and network interfaces or network interface cards (NICs).

Many modern computer processing units (CPUs), which can be implemented in hosts for VNFs or other remote functionality, offer a tradeoff between computing power and energy efficiency (e.g., power consumption, heat generation) depending on the CPU's clock speed. A CPU can transition between a lower clock speed (lower energy) state to a higher clock speed (higher energy) state at the direction of an operating system (OS) or an orchestration system. This allows the host to run the CPU at a lower clock speed to reduce energy consumption and the need for heat dissipation when the compute load is lower. The host can also ramp up clock speed in response to increased compute load. This technique is generally known as CPU frequency scaling.

CPU frequency scaling presents certain complications and complexities in virtualized environments not present in local implementations. Improved techniques for managing CPU frequency scaling are valuable to improve the function and reliability of VNFs, which ultimately impacts user experience, as well as preserve energy, which ultimately impacts host costs.

Additional computing techniques and implementations present similar opportunities. For example, comparable issues exist with container technology. Like VMs, containers use compute resources of a host OS to run a tenant workload. CPU frequency scaling and other resources management techniques are thus pertinent beyond the VM environment.

This disclosure is directed to solving one or more of the problems in the existing technology.

SUMMARY

In an aspect, a method may comprise predicting, based on corresponding historical workload data, a change in virtual network function demand during a future workload period, wherein the virtual network function is supported by a node. The method further comprises determining a target clock speed of a physical central processing unit (CPU) core in the node corresponding to the change in the virtual network function demand and adjusting the physical CPU core of the node to the target clock speed corresponding to the change in the virtual network function demand for the future workload period.

In another aspect, a method may comprise predicting, based on corresponding historical workload data, a future demand during a future workload interval, wherein the demand supports a virtual network function or container, and wherein the demand is met by a server. The method can further comprise determining a target clock speed of at least one central processing unit (CPU) core corresponding to the future demand, wherein the at least one CPU core is within a processor in the server, and causing the at least one CPU core to adjust to the target clock speed corresponding to the change in the demand for the future workload interval.

According to yet another aspect, a system may include a virtual element workload database configured to store historical workload data for a virtual network function, wherein the virtual network function is supported by one or more host central processing unit (CPU) cores, and an analytics engine configured to predict a target clock speed for the one or more host CPU cores during a future load period based on the historical workload data.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

As noted above, CPU frequency scaling increases in complexity in virtualized environments where host devices or remote resources are distant from nodes or devices with which they interact. In one example complication, latency in vCPU clock speed may cause quality of service issues or even failures (e.g., where ramp-up exceeds timeout, such as mobility timers which are frequently set to less than one second), or may waste energy by remaining at higher speed than necessary aggregated over thousands of scaling operations. In another (or related) example complication, guest OSs may be configured to assume that a CPU is running at maximum clock speed, or that they (the guest OSs) can control CPU clock speed. As this may be untrue, conflicts can occur, such as forcing a guest OS into a false overload mode when a workload spike occurs in the guest OS.

To resolve these problems, workload prediction based CPU frequency scaling is disclosed. VNF traffic patterns can be determined, analyzed, and synthesized to determine compute load peaks and troughs to proactively and preemptively scale CPU frequency. (Unless expressly noted otherwise, discussion of collecting and analyzing traffic patterns for VNFs is equally applicable to VMs and vice versa, and similarly applies to container technology and other host/client resource environments.)

In embodiments, traffic and resources consumed in a virtualized environment can be observed and recorded over time. VNF traffic pattern information can be developed based on historical data, individually by VNF. An orchestration and analytics engine can model and use the historical and projected data to develop a predictive assessment of expected VNF workload and preemptively scale up or down CPU clock speeds of compute nodes to match predicted workloads. Preemptively scaling avoids latency and other problems, preventing undesirable results such as sluggish performance for a guest OS or failures while still allowing processors to return to lower clock speeds and preserve energy when compute load drops. Aspects herein can also prevent incorrect overload protection triggers on a VNF application due to sluggish clock speed ramp up which cannot keep up with the workload spike.

While the Detailed Description generally discusses VMs and VNFs for ease of explanation, it is expressly noted that aspects of the disclosure are equally applicable to container technology and other systems or methods in which host resources are applied to perform tasks on behalf of a hosted workload.

Figure 1A:
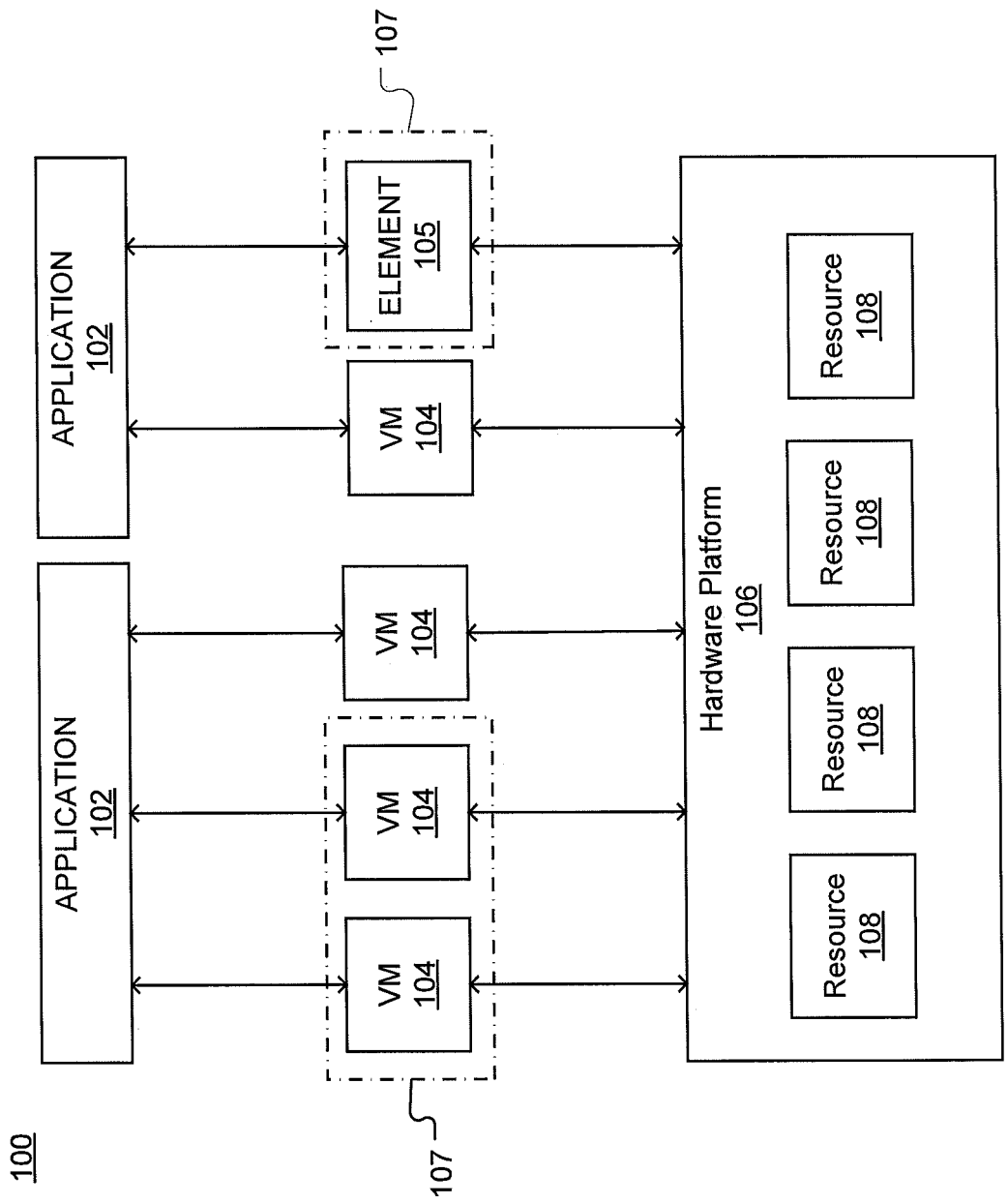
FIG. 1A is a representation of an example network.

Turning to the drawings, FIG. 1A is a representation of an example network 100. Network 100 may include one or more applications (which in turn may include one or more VNFs) implemented on general purpose hardware, such as in lieu of having dedicated hardware for every network function. That is, general purpose hardware of network 100 may be configured to run applications. In embodiments, general purpose hardware may be combined with special purpose hardware, within hardware platform 106, embodied as element 105, or distributed elsewhere within a network to which elements of FIG. 1A are communicatively coupled, to achieve particular functionality.

Each application 102 may use one or more VMs 104 or elements 105 to operate. Each VM 104 may have a VM type that indicates its functionality or role. Examples of VMs 104 include gateways (GWs), firewalls (FW), routers, real-time analytics, customer edges (vCEs), provider edges (vPEs), proxies, rendezvous points (RPs) or the like. Similarly, each element 105 may have an element type that indicates is functionality or role. Examples of elements 105 include an ingress point, an egress point, a non-virtualized function, or the like. While specific reference may be made to VMs 104 or groups (which may include one or more elements 105), this is for explanation to show that the deployment plan may not necessarily limited to virtual components in all implementations. As noted earlier, while VMs are discussed for ease and consistency of explanation, this focus may be substituted by or supplemented with focus on containers. For example, one or more of VMs 104 or elements 105 can be a container. Similarly, various clients can be substituted for or comprise application 102, including but not limited to databases, webservers, media transcoders, other cloud applications, et cetera.

Each VM 104 may consume various network resources from a hardware platform 106, such as resources 108. For example, resources 108 may include one or more virtual central processing units (vCPUs), memory, or a network interface cards (NIC). Resources 108 can be dedicated or commingled in support of one or more VM 104, with such utilization or assignment being performed dynamically, and need not conform to any particular arrangement (e.g., multiple CPUs can support one VM, multiple VMs can be supported by one CPU, et cetera). Various rules can be used in such allocation.

Figure 1B:
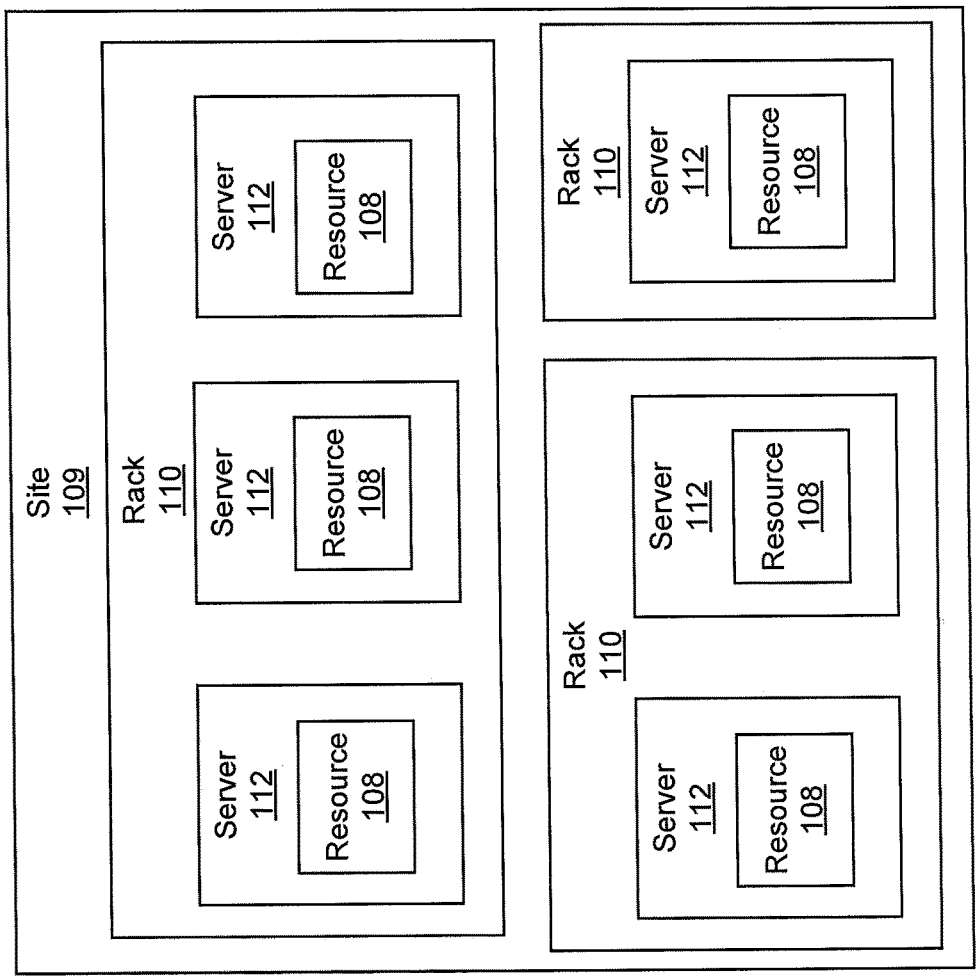
FIG. 1B is a representation of an example hardware platform for a network.
Figure 1B:
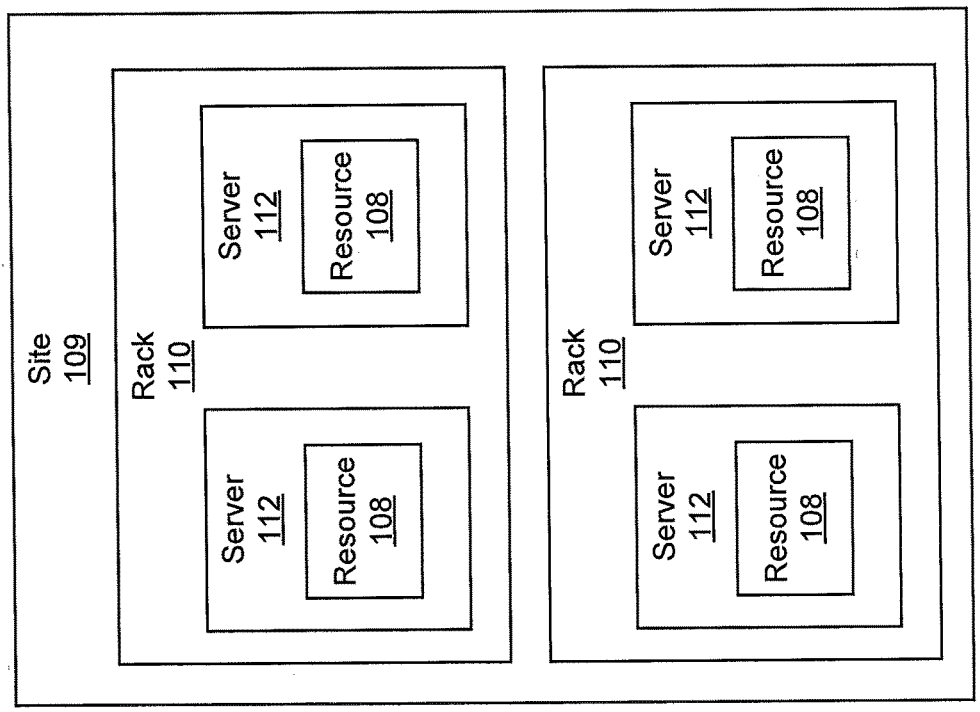

While FIG. 1A illustrates resources 108 as collectively contained in hardware platform 106, the configuration of hardware platform 106 may be further delineated. FIG. 1B provides an example implementation of hardware platform 106.

Hardware platform 106 may comprise one or more sites 109. For example, a site 109 may be a room, building, or geographic location in which resources 108 are located. For example, site 109 may be a datacenter. Each site 109 may comprise one or more racks 110. In an aspect, rack 110 may refer to the physical housing or platform for multiple servers or other network equipment. In an aspect, rack 110 may also refer to the underlying network equipment. Each rack 110 may include one or more servers 112. Server 112 may comprise general purpose computer hardware or a computer. In an aspect, rack 110 may comprise a metal rack, and servers 112 of rack 110 may comprise blade servers that are physically mounted in or on rack 110.

Each server 112 may include one or more network resources 108, as illustrated. Servers 112 may be communicatively coupled together (not shown) in any combination or arrangement. For example, all servers 112 within a given site 109 or rack 110 may be communicatively coupled. As another example, servers 112 in different racks 110 may be communicatively coupled. Additionally or alternatively, racks 110 may be communicatively coupled together (not shown) in any combination or arrangement.

The characteristics of each site 109, rack 110, and server 112 may differ. For example, the number of racks 110 within two sites 109 may vary, or the number of servers 112 within two racks 110 may vary. Additionally or alternatively, the type or number of resources 108 within each server 112 may vary. In an aspect, rack 110 may be used to group servers 112 with the same resource characteristics. In another aspect, servers 112 within the same rack 110 may have different resource characteristics.

A single application 102 may include many functional components (e.g., VMs 104 and elements 105. These components may have dependencies upon each other and intercommunication patterns with certain quality of service (QoS) requirements, such as locality, high availability, and security. Consequently, placement decisions—that is, decisions on how (and where) to implement VMs 104 and other elements 105 within hardware platform 106—may be based on all VMs 104 in which the components of application 102 run, including the dependencies of those VMs 104, holistically.

Such QoS requirements may be domain or application specific. Thus, a deployment plan for assigning resources 108 to VMs 104 of an application may depend upon certain limitations and requirements of both network 100 and application 102, such as the QoS requirements of a given application 102 and the underlying infrastructure of network 100. As all of this information is not typically accessible to both the application provider (that may not have access to network infrastructure details) and the cloud provider (that may not have access to the functionality of application 102), an abstraction may be used to create a deployment plan for application 102, where creation of the deployment plan can occur without knowledge or consideration of the specific infrastructure information.

A deployment plan may assign VMs 104 to particular resources 108 in accordance with one or more rules in order to account for the requirements of application 102 supported by such VMs 104. These rules may be based on abstracting the requirements of application 102, such as by levering the application provider's knowledge on its application 102 to yield a concise and flexible representation of the locality, availability, and security requirements of application 102 without needing to capture the specifics of the cloud infrastructure underlying network 100. The deployment plan may be based on one or more affinity rules, diversity (or anti-affinity) rules, exclusivity rules, or pipe rules. The deployment plan may further be based on nesting groupings (e.g., rules or sets of VMs 104). For example, the abstraction may provide for certain VMs 104 to be grouped together, so that rules may be applied to groups of VMs 104 or to individual VMs 104. A group may include one or more VMs 104, or other elements 105, such as ingress points, or the like. For example, FIG. 1A shows two example groups 107.

FIGS. 1A and 1B provide an environment for systems described herein, which can be include host systems, guest systems, or orchestration systems. In an example, VNFs implemented on such environments can include a virtual Mobility Management Entity (vMME), a virtual System Architecture Evolution with Packet Data Network Gateway and Serving Gateway (vSAEGW), a virtual Home Subscriber Server (vHSS), a virtual Diameter Routing Agent (vDRA), virtual firewall (vFW), virtual router (v-Router), et cetera, and other virtualized functions supporting wireless networks.

For example, a vMME can be defined in terms of MME functions or subcomponents, each of which is supported alone or in combination by one or more VMs 104 (which can be dedicated or shared VMs actively engaged or available in standby). VMs 104 are supported by resources 108 of hardware platform 106 and/or other hardware platform. CPU time from resources 108 is allocated to VMs 104 for the vMME. If on-demand frequency scaling is used in host resources 108, CPU speed will reactively lag behind compute load by a latency length dependent on the amount of scaling to occur. For example, a transition from 1.2 GHz to 2.5 GHz may lag by four to five seconds, several times the length of mobility timers (for, e.g., Enhanced 911, voice over LTE, and LTE mobility, and similar implementations on 5G or other standards). Based on technical parameters and quality of service, four to five seconds of ramp up is too slow for mobility core applications where millions of subscribers may be on a single application node and may cause traffic spikes within a few milliseconds. Where ramp-up duration is, e.g., four to five seconds, processor transitions simply cannot keep up with such spikes, especially when the application is transitioning to heavier busy-hour workload regime. In embodiments, much shorter durations may still present similar problems.

While certain aspects herein describe workload prediction based CPU frequency scaling implement for VMs and VNFs providing virtualization for mobility networks, the aspects herein are similarly relevant to other virtualized applications and environments. For example, uses of workload prediction based CPU frequency scaling can include, but are not limited to, content streaming, processing-intensive engineering modeling, infrastructure as a service or platform as a service, Internet-of-Things or big data analytics, software testing, backup and disaster recovery, et cetera.

Figure 1C:
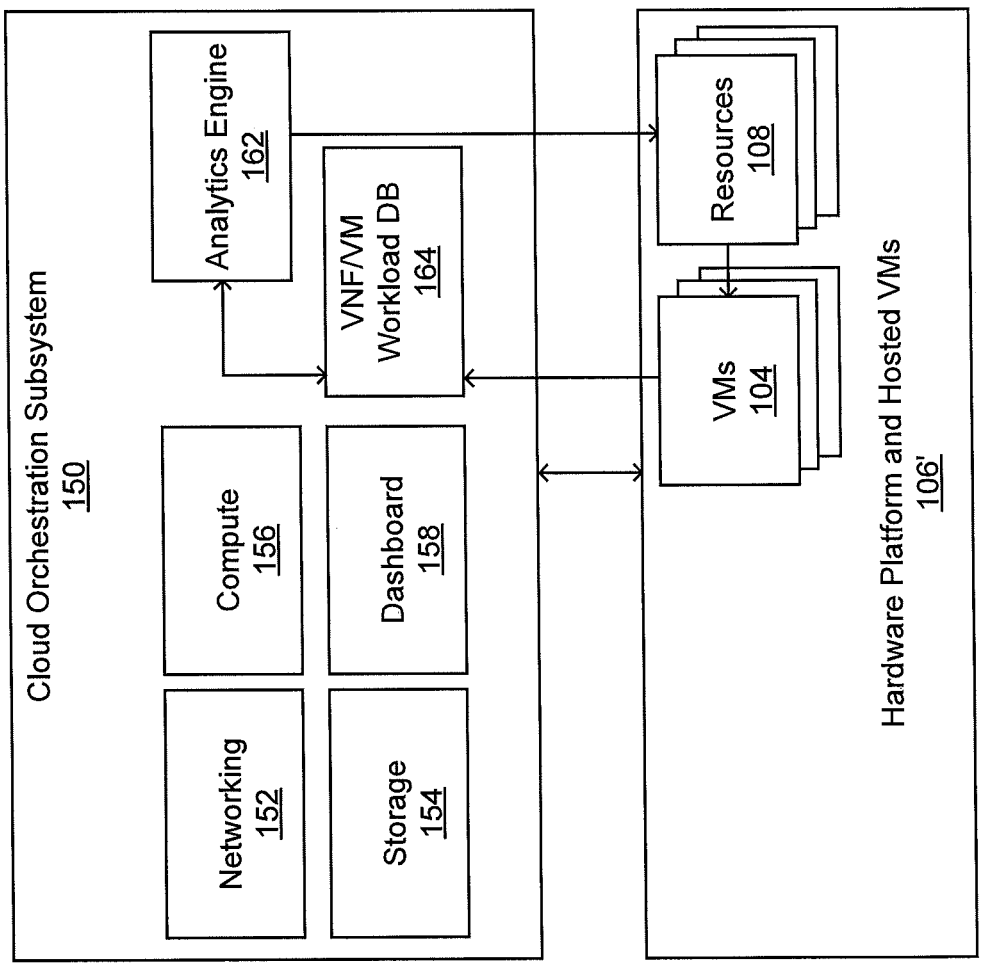
FIG. 1C is a representation of an example system for implementing workload prediction based CPU frequency scaling.

FIG. 1C illustrates an example system for implementing workload prediction based CPU frequency scaling as supported by environments like those of FIGS. 1A and 1B. FIG. 1C includes cloud orchestration subsystem 150 and hardware platform and hosted VMs 106'. While arrows in FIG. 1C illustrate example data flow or support relationships, in alternative or complementary embodiments directions shown may be reversed or each connection may be two-way. Further, elements shown without connections may still be operatively coupled to different elements shown or other elements within a network (e.g., dashboard 158 can operatively coupled with analytics engine 162, database 164, and/or elements of hardware platform and hosted VMs 106', et cetera).

Cloud orchestration subsystem 150 can use and/or control resources 108 (or other local or remote resources) including frequency scaling of CPUs therein. Cloud orchestration subsystem 150 can be implemented as one or more applications 102 and includes analytics engine 162 capable of accessing and analyzing historic VNF and/or VM workload data in VNF/VM workload database 164, then developing predictions of workloads based thereon. One or more VMs 104 can be allocated to operation of analytics engine 162, in conjunction with cloud orchestration subsystem 150 or separately in alternative embodiments. Networking 152, storage 154, and compute 156 resources are allocated to cloud orchestration subsystem 150 in addition to analytics engine 162 and database 164 storing historic VNF and/or VM workload data. While FIG. 1C illustrates a cloud implementation of cloud orchestration subsystem 150, cloud orchestration subsystem could be run by a local system or a different bank of resources while still acting on a cloud containing hardware platform and hosted VMs 106'.

Database 164, which can be implemented in an application 102 with data stored in resources 108, can include VNF and VM compute loads at varying intervals, including year, month, week, day, hour, minute, second, et cetera, including longer or shorter time periods. These can be received or observed from, e.g., VMs 104 (and/or other VMs/VNFs), either by an agent within database 164, through VMs 104 writing to database 164, through dashboard 158, via an intermediary service, or by other means. The compute loads stored can include CPU clock speeds and CPU time, energy consumption, or other metrics which can be calculated and analyzed in terms of multiple disparate CPU types and speeds (i.e., demand data can be hardware or platform agnostic or convertible between implementation-specific units). Database 164 can also contain ongoing VM or VNF performance data based on the use of predictions to allow the system to learn and adapt over time. In addition, database 164 can contain current or previous models used by analytics engine 162 to preemptively determine compute loads for predictive CPU frequency scaling.

Analytics engine 162, which can be implemented in an application 102, utilizes information from the database to determine a predictive CPU frequency scaling for one or more CPUs (which can be within resources 108 and used by/for VMs 104, or may be part of a different system being observed and managed by the cloud orchestration subsystem as implemented in network 100).

In embodiments, this determination is made by identifying a compute load associated with a corresponding historical time (e.g., day of week and time of day). Historical analysis shows trends in loads, such as increases during business hours and decreases after hours in a succession of waves over days. These trends inform accurate predictive CPU frequency scaling in virtualized environments.

In embodiments, analytics engine 162 references a previous corresponding time to provide a predictive VM or VNF workload at a future time. This can include a previous workload lookup from a table or calendar. The table or calendar can reference the most recent corresponding instance (e.g., particular hour of day of week) or multiple corresponding instances (e.g., noon hour for last 52 Tuesdays, noon hour for last five November 10ths, all data for a particular time and date). Where multiple corresponding instances are identified, a variety of techniques can be used to determine the prediction, such as selecting a maximum among the set, developing an average, selecting a quartile or other fraction based on contextual data, et cetera.

In embodiments, analytics engine 162 may develop or utilize a workload model which is solved or calculated to develop predictions. The model may determine compute load on VNFs and/or VMs as a function of a prediction time (e.g., 12:00 PM on a Wednesday in February) to calculate predicted compute loads associated with such times. In embodiments, analytics engine 162 can check for model override times or conditions reflecting non-modeled values associated with particular dates, times, or events. For example, web service and e-commerce providers can expect an increase in traffic on large online purchasing days like "Cyber Monday." Because traffic on Cyber Monday would constitute an outlier from a model (e.g., a model including the rest of December, traffic for the quarter, traffic for the year), a model override time can be associated therewith to avoid undershooting the necessary compute resources.

Models may be structured to establish a minimum compute power clocking CPUs to different model values based on historical data. In an embodiment, a minimum compute power clocks CPUs among resources 108 to deliver at least the last recorded maximum associated with the particular time interval. Mean, median, or more complex statistical values can be used to determine predictive model values where multiple data points are available. More, these values can be calculated individually per-VM/VNF or per-CPU, or aggregated into combined load and combined corresponding compute resources. These combinations can relate to some or all loads and resources within network 100. Depending on CPU model and capability, expected quality of service, and other variables, CPUs supporting the same or identical VMs or VNFs can be assigned the same or different clock speeds.

In embodiments, analytics engine 162 can also monitor real-time performance of VMs and/or VNFs. In this fashion, the effectiveness of ongoing prediction based CPU frequency scaling can be assessed to enforce QoS requirements or other constraints. A backup dynamic CPU frequency scaling algorithm can be implemented to ensure VM/VNF needs are met if a data point or model significantly underestimates workload during a time interval. More, anomalous load patterns can be identified in real-time to determine and address events which do not correspond to historical data or an analytics engine predictive model. For example, in the event of an outage scenario, an outage mode can be implemented, or CPU frequency scaling can be dynamically controlled until the end of the event. Such events can have rule-based procedures available on-call to ensure service continuity and compatibility during anomalies. For example, dynamic control can involve switching temporarily to a different model (e.g., an outage model), combining predictive and on-demand scaling, or reverting to temporary on-demand CPU frequency scaling. In embodiments, where the prediction undershoots actual demand, a compute load buffer can be established (e.g., making available excess compute resources) until future predictions re-converge with actual demand.

More, feedback from model performance can be used to refine existing or develop future models. Historical data points or models which subsequently allocate excess compute may increase efficiency by reducing CPU clocking in future use, and instances in which compute resources are below VM/VNF requirements can be used to increase CPU clock speed during future corresponding times. Machine learning and artificial intelligence can be utilized in conjunction with analytics engine 162 to refine models based on continuous feedback.

Models can also incorporate expected changes based on historical trends outside a corresponding time period or interval. Returning to the "Cyber Monday" example, if traffic in previous Cyber Mondays grew different amounts each year—15%, 8%, 12%, et cetera—a projected growth can be incorporated into subsequent predictions. Routine workload can be similarly modeled, accounting for network growth due to increased bandwidth and network device capabilities, Internet-of-Things adoption, et cetera.

After determining a predicted CPU frequency scaling value, analytics engine 162 can cause the CPUs to clock according to the prediction based CPU frequency scaling value. This can be done directly, for example, in embodiments where cloud orchestration subsystem 150 implemented in an application 102 can control resources 108 (or other resources which do not support application 102). This can alternatively or complementarily be done indirectly, whereby cloud orchestration subsystem 150 communicates with other components (within outside network 100) to effect adjustment or provide control parameters for CPU scaling.

In embodiments, cloud orchestration subsystem 150 can include dashboard 158. Dashboard 158 can be available to users on the host (e.g., administrators associated with resources 108) or the guest (e.g., users of applications 102) to collect, receive, or display relevant information such as current predicted compute load, actual compute load, future predicted compute load, historical data, maximum available resources at current state, maximum available resources in maximum output (e.g., one or more CPUs clocked to maximum speed) state, et cetera.

Workload prediction based CPU frequency scaling can be utilized with other techniques to increase its utility in certain embodiments. For example, disabling certain controls can increase performance or compatibility. In embodiments, a compute host OS CPU governor on demand frequency scaling parameter can be disabled, and a compute clock can be set to performance mode. This can prevent conflicts with workload-based scaling responsive to real-time compute loads and allow full control through predictive techniques, reducing latency, false overload indications, and loss of efficient quality.

Figure 2A:
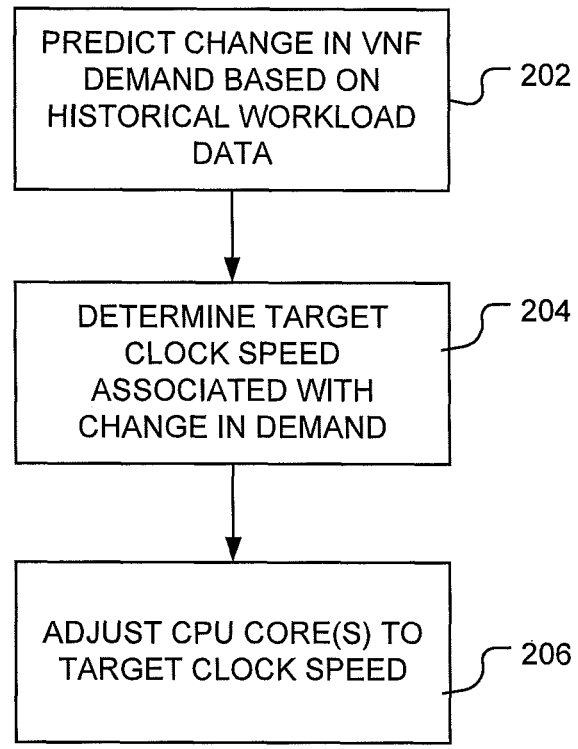
FIG. 2A is a method that may be used to implement workload prediction based CPU frequency scaling.

FIG. 2A illustrates a method 200 for implementing workload prediction based CPU frequency scaling. At 202, the method predicts a change in VNF demand based on historical workload data associated with that VNF. Historical workload data can be sourced from a database 164. The prediction may be based on a correlated time (e.g., particular hour of a day of the week, a particular minute when scheduled activity occurs, an annual holiday, et cetera) or a model of historical activity for which a correlated time is a parameter.

To provide further details on environments in which, e.g., method 200 may be used, it is understood that one or more physical servers are used to support hosted VMs (or containers, et cetera). A physical server may have one to eight (or more) processor sockets. Each processor socket has a single processor. Each processor is a single chip consisting of tens of physical CPU cores (typically 20-30 physical cores per processor, although there could be more or fewer). Clock frequency can be controlled at the granularity of a physical CPU core (e.g., frequency for each individual core can vary with respect to others). Clock frequency may also be controlled at the granularity of a hardware thread or "hyper thread." A single physical core may include one or more hyper threads. Two or more processes can run on separate hardware hyper threads of a physical core, and may be provided memory and other resources to allow multitasking by permitting one process to use an instruction execution engine of the processor if another process running on the other hardware hyper thread is blocked due to, for example, a storage system call. Demand (and thus, by the disclosures herein, clock frequency) can be a function of which hyper thread is in execution. During scaling as disclosed herein, cores or threads can be grouped for common scaling to bring all cores or threads to a target clock speed, or collective scaling to meet a particular demand by scaling multiple cores or threads to different speeds achieving a desired sum of resources.

Continuing, a VM (or a container, et cetera) may be assigned multiple physical CPU cores across one or more processors. For example, a vMME VM may run on ten physical CPU cores on one socket, eight physical CPU cores on the second socket, and no physical CPU cores on third and fourth sockets. Method 200 (and other systems and methods disclosed herein) utilize predictive logic to increase and/or decrease the clock speeds of only these physical CPU cores without changing the clock speeds of remaining physical CPU cores of the server. More, applications may be "pinned" to specific physical CPU cores to dedicate those cores to the application. However, if the application is not pinned to specific physical CPU cores, it may "move around" (e.g., be supported by and receive compute resources from) any of the physical CPU cores based on host OS scheduling. In such embodiments, predictive logic can be used to alter the clock speed of all the physical CPU cores of the server on which the application could be scheduled by using a weighted averaging and expected workload variation.

At 204, a determination is made regarding a target clock speed associated with the predicted change in demand. The target clock speed can be a clock speed for one or more physical CPU cores of one or more of the processors in one or more servers. The target clock speed can increase a current CPU core speed to ramp up available compute resources, or reduce a current CPU core speed to preserve resources when compute resources are not needed. Thereafter, at 206, the CPU core is adjusted to the target clock speed to meet the predicted demand.

Figure 2B:
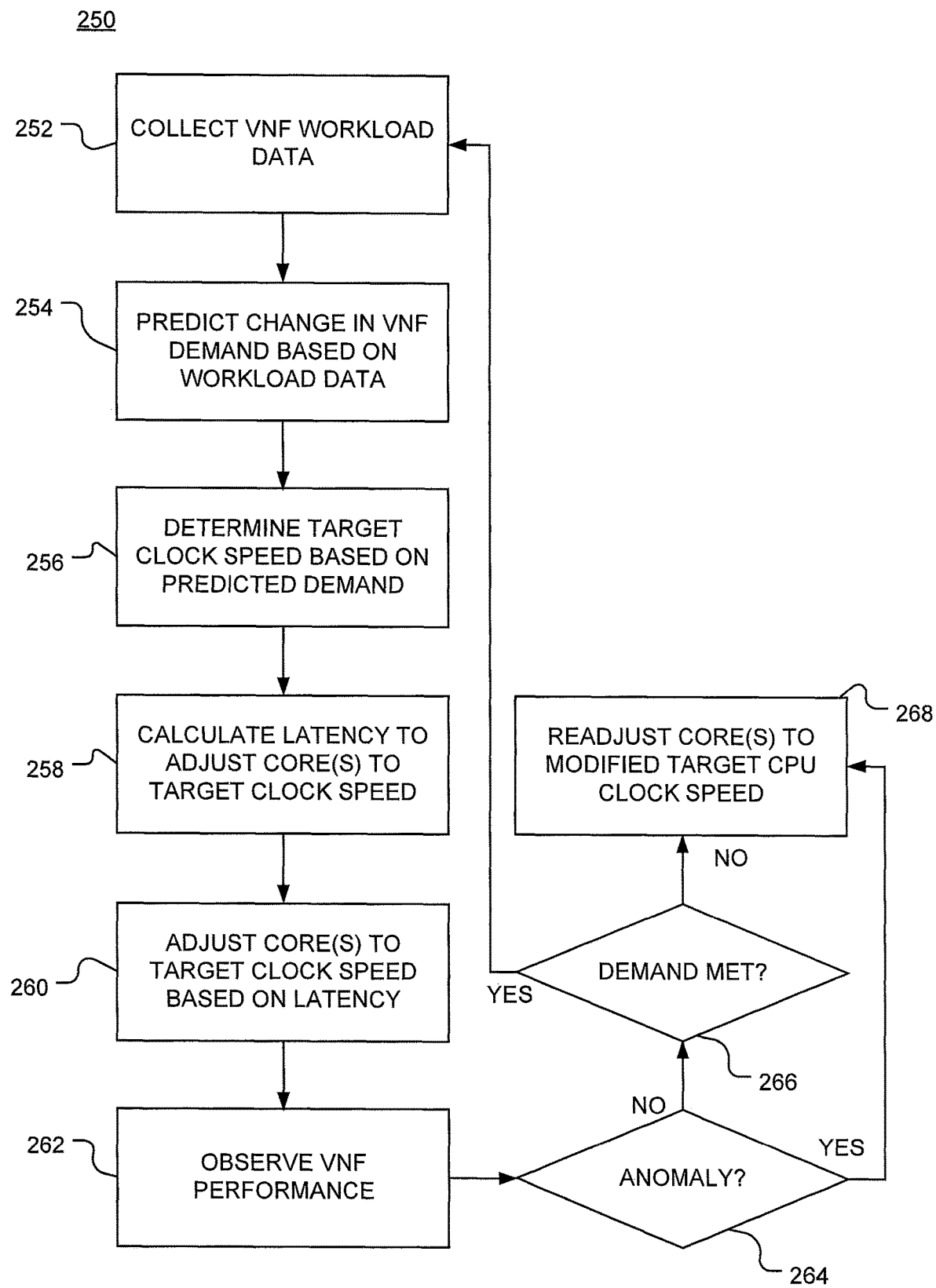
FIG. 2B is a method that may be used to implement workload prediction based CPU frequency scaling.

FIG. 2B illustrates another method 250 for implementing workload prediction based CPU frequency scaling. At 252, method 250 collects workload data associated with one or more VNFs. The workload data can be logged in terms of processor speed and time or compute resources consumed. Based on the workload data, method 250 can predict changes in VNF demand—and underlying compute resources—based on the workload data. This can include modeling the workload data and solving the model based at least in part on the time interval covered by the prediction, or identifying a correlated time (e.g., the same time one year ago) and using the same or adjusted (e.g., scaled for network growth) values for the prediction.

At 256, target clock speeds are identified for one or more CPU cores providing compute resources to the VNFs. The one or more CPU cores can be within one or more processors in one or more servers. The target clock speeds may increase, decrease, or maintain initial or prior clock speeds. At 258, a latency is calculated to determine a time synchronize adjustment of a CPU core as it transitions to the target clock speed from its earlier initial speed. Latency can be calculated for a single core or for multiple cores, and may differ depending on scaling parameters (e.g., where cores are currently operating at different frequencies or ramping to different frequencies). The latency can include one or both of a ramp-up or ramp-down time for the CPU core(s) as well as network delays (e.g., latency due to transmission time). A change time can be identified based on the calculated latency. The change time can be the offset required to ensure a CPU core is "ramped up" to its target speed by the time its additional compute resources are required. The change time can be an absolute time (e.g., 12:53:08.550 ET on Friday, Mar. 23, 2018) or a relative time based on conditions or events (e.g., 2.365 seconds after a request is acknowledged). Based on the latency, a command to change the CPU core clock speed is timed to the change time to preemptively set the CPU core clock speed in advance of or current with predicted demand to avoid sluggish performance or loss of quality, or to prevent excess energy consumption, which could result from failure to account for latency. Adjusting the CPU core to the target clock speed occurs at 260.

After adjusting the CPU core to the target clock speed at 260, at 262 VNF performance is observed to determine whether the predicted demand satisfactorily fit actual demand. At 264, a determination is made as to whether an anomaly in demand has rendered the predicted demand obsolete or incorrect. If so, method 250 proceeds to 268 where the CPU core clock speed can be adjusted again. If not, method 250 proceeds to 266 where a determination is made as to whether VNF demand is met. If so, method 250 may recycle to 252 where ongoing workload data can be added to previously collected VNF workload data. Alternatively method 250 can end, or determine if demand is exceeded to reduce clock speed. If the determination at 266 returns negative, method 250 can proceed to 268 where a modified target CPU core clock speed is determined and the CPU is readjusted to match the modified target CPU core clock speed. The modified CPU core clock speed can be based on an alternative model, an arbitrary setting (e.g., maximum clock speed), demand-based frequency scaling, hybrid techniques combining predictive modeling and demand-based frequency scaling, or other techniques.

While methods 200 and 250 illustrate embodiments of methods for implementing workload based CPU frequency scaling, alternative or complementary aspects can be utilized with or in lieu of these methods without departing from the scope or spirit of the innovation. For example, steps related to other aspects disclosed herein could be added, or steps removed, in alternative embodiments.

Figure 3:
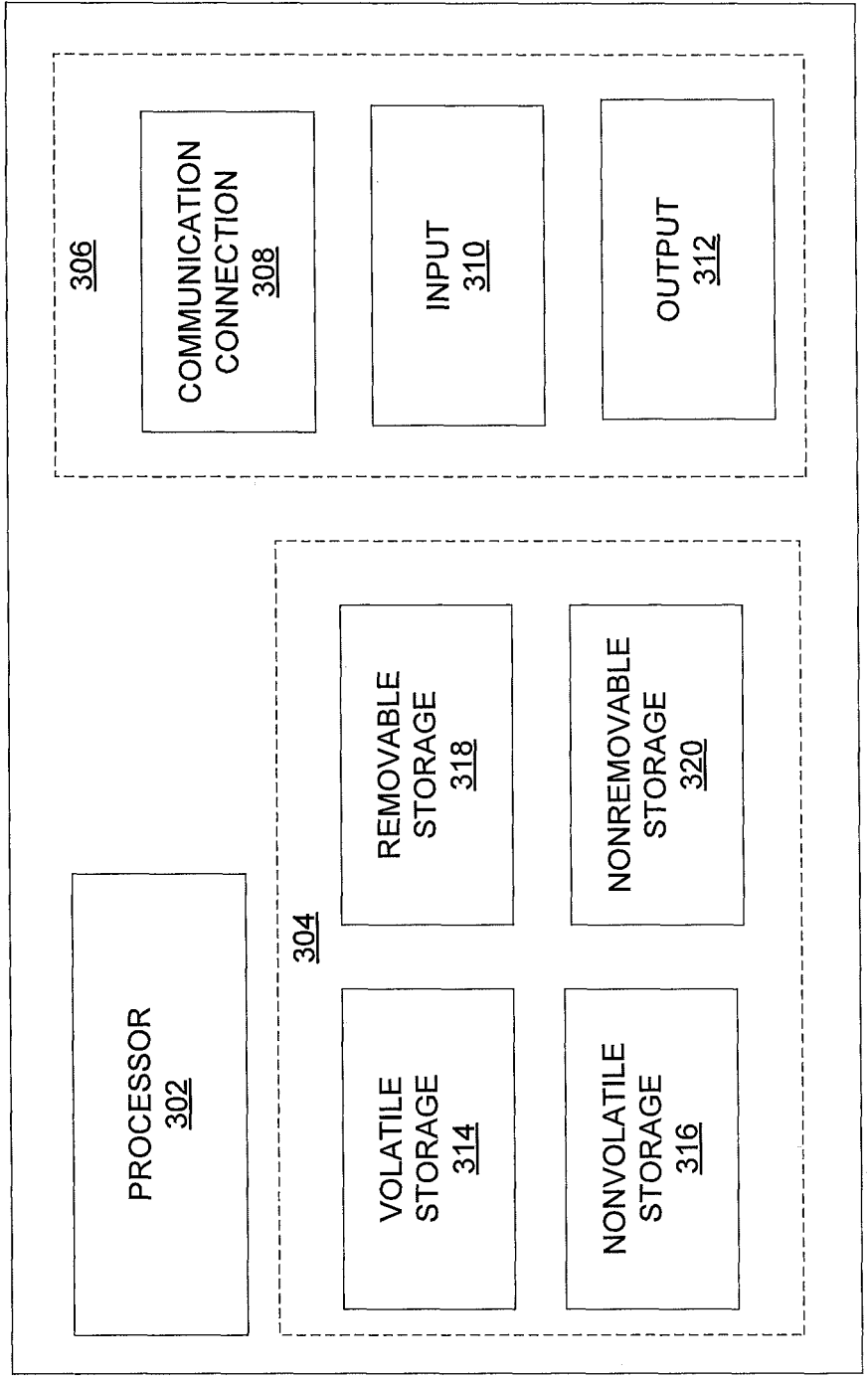
FIG. 3 is a schematic of an example device that may be a component of the system of FIG. 2A.

FIG. 3 is a block diagram of network device 300 that may be connected to or comprise a component of network 100. For example, network device 300 may implement one or more portions of method 200 for placement of network components of application 102. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is example and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications there between. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
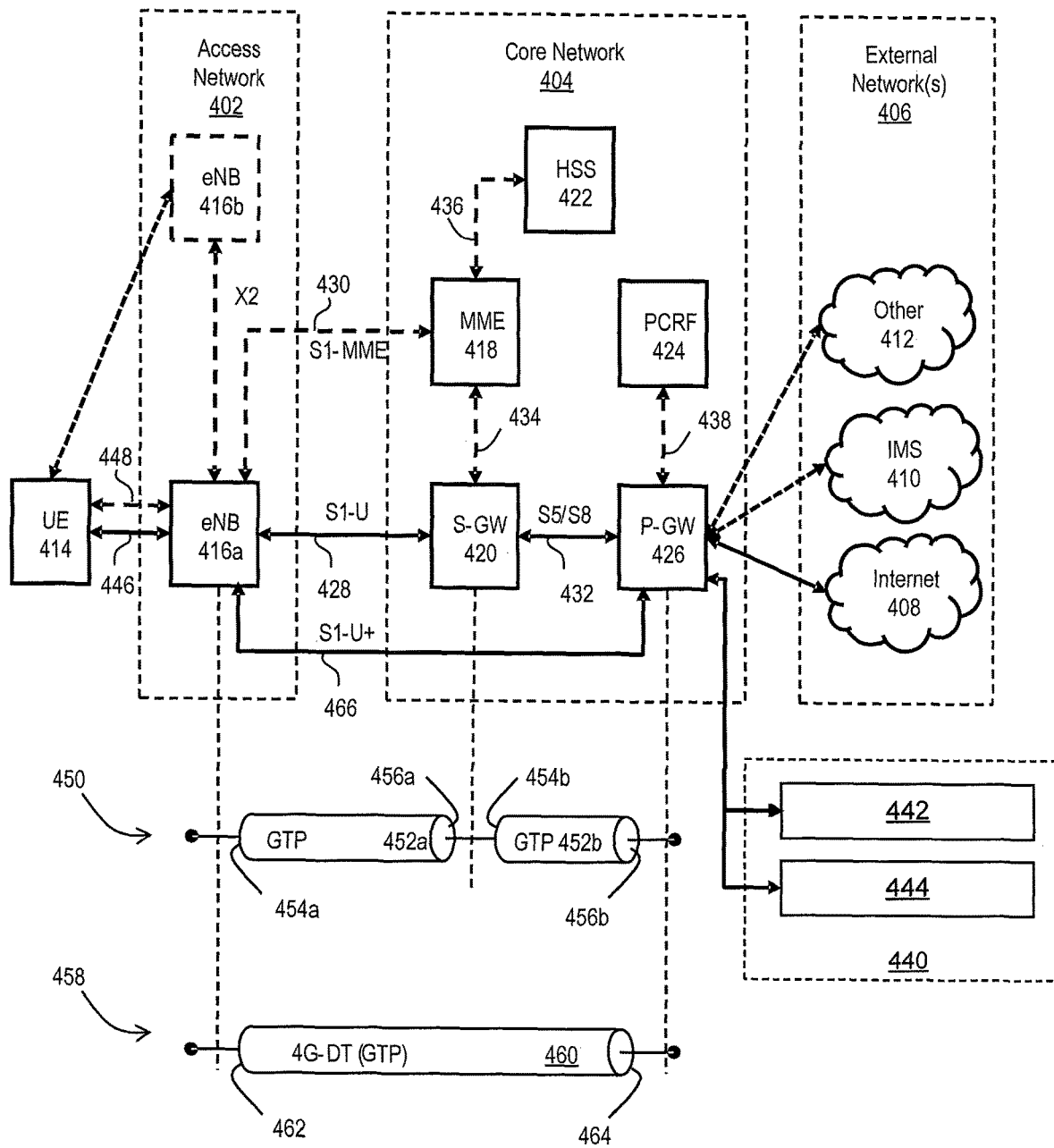
FIG. 4 depicts an example communication system that provide wireless telecommunication services over wireless communication networks upon which an application may be deployed using the disclosed systems or methods.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture. While aspects of FIG. 4 and accompanying of network architecture 400 are discussed in relation to LTE, it is expressly noted that aspects herein can be alternatively or complementarily implemented in 5G (or other) network architectures without departing from the scope or spirit of the innovation.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MIME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service requirements for the user, et cetera. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LIE-EPS network architecture 400, the core network, data bearer portion of the end-to-end IP service is analyzed.

An establishment may be defined herein as a connection set up request between any two elements within LIE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., SI signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
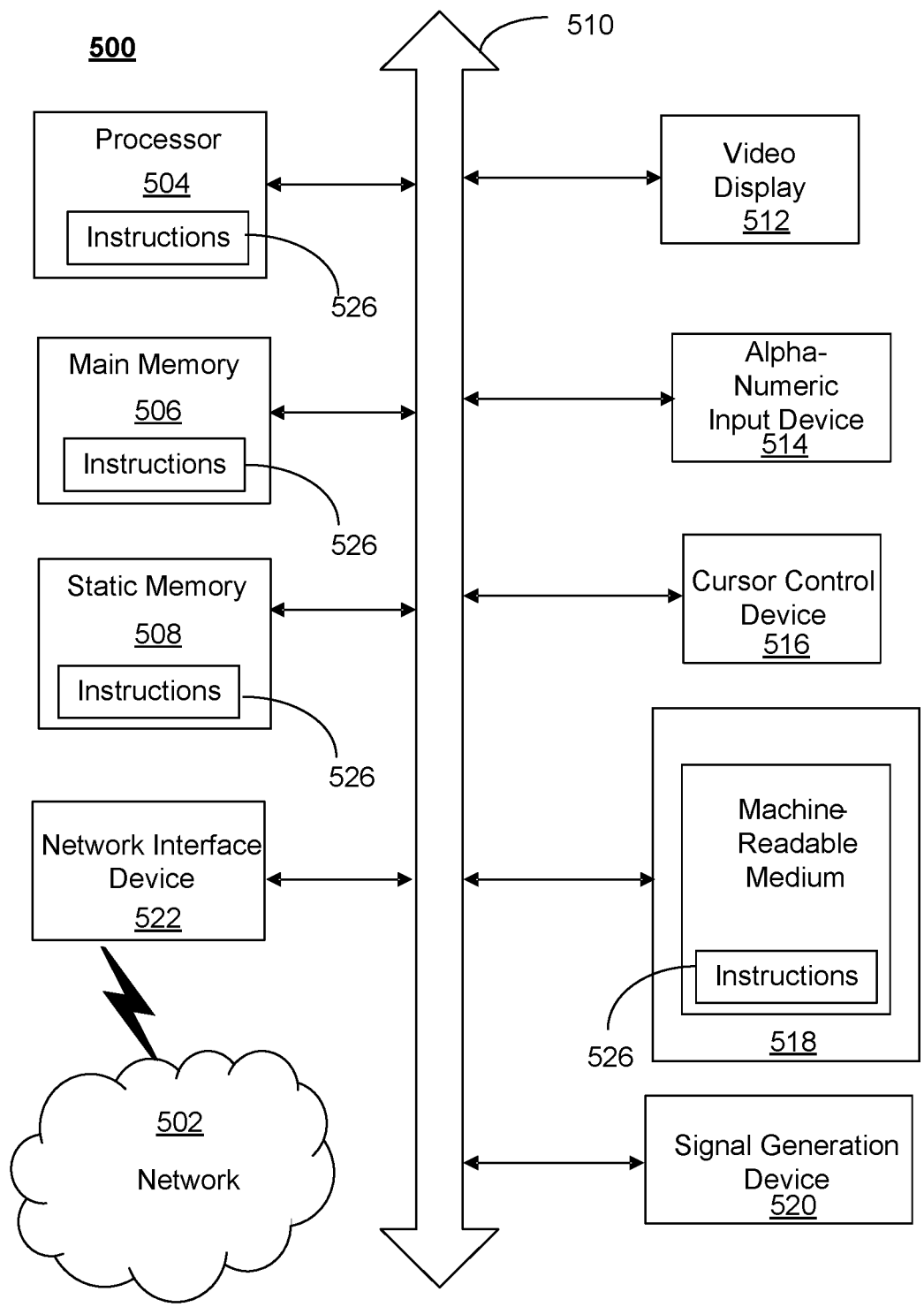
FIG. 5 depicts an example communication system that provide wireless telecommunication services over wireless communication networks that may be modeled using the disclosed systems and methods for configuring a virtualized network platform.

FIG. 5 depicts an example diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
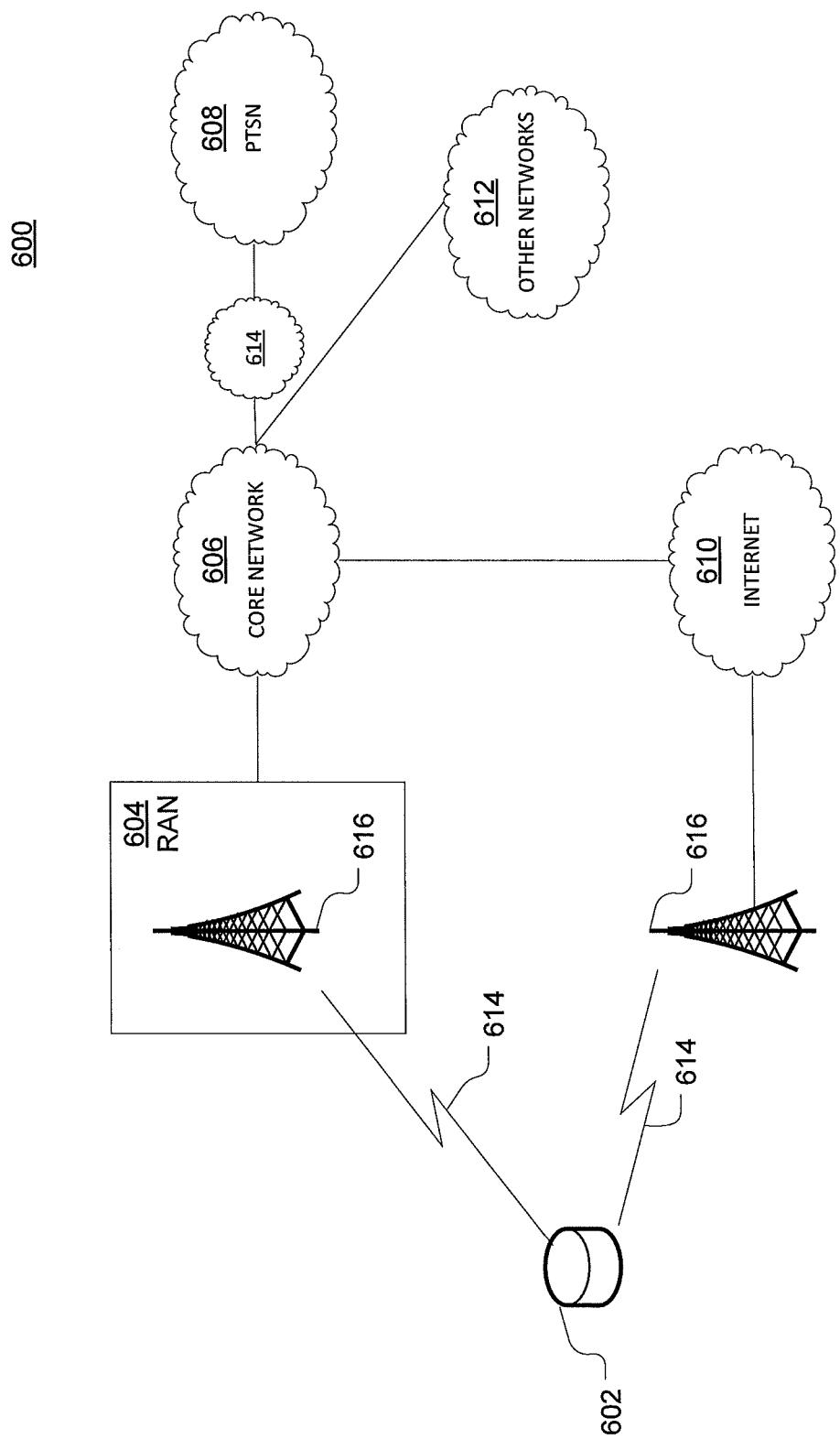
FIG. 6 is a diagram of an example telecommunications system in which the disclosed systems or methods may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614. As with other portions of this disclosure, while aspects relating to FIG. 6 are at times described in relation to LTE architectures, 5G architectures (and others) may be incorporated or utilized without departing from the scope or spirit of the innovation.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, et cetera) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
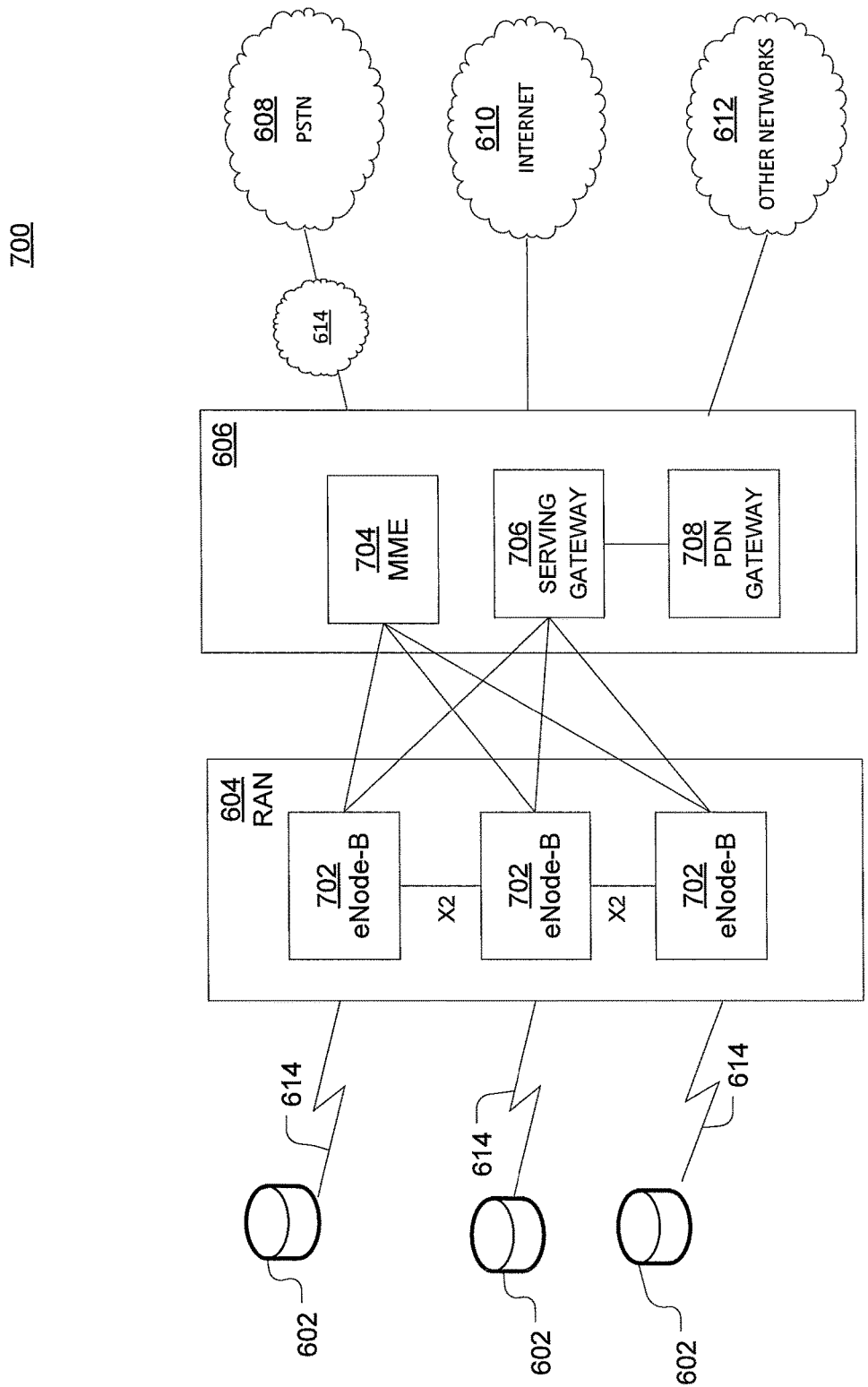
FIG. 7 is an example system diagram of a radio access network and a core network upon which an application may be deployed using the disclosed systems or methods.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

The methods and systems associated with predictive CPU frequency scaling and methods as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing content delivery as described herein. When implemented on a general-purpose processor, the program code combines with the processor to provide a unique device that operates to invoke the functionality of a streaming system.

While predictive CPU frequency scaling systems and methods have been described in connection with the various examples of the various figures, it is to be understood that other similar implementations may be used or modifications and additions may be made to the described examples of a system or method without deviating therefrom. For example, one skilled in the art will recognize that a streaming system as described in the instant application may apply to other environments combining both local and network elements and components. Therefore, CPU frequency scaling systems and methods as described herein should not be limited to any single example, but rather should be construed in breadth and scope in accordance with the appended claims and other disclosed embodiments.

What is claimed is:

1. A method, comprising:
predicting, based on historical workload data, a predicted change in virtual network function demand during a future workload period, wherein the virtual network function is supported by a node;
determining a target clock speed of a physical central processing unit (CPU) core in the node corresponding to the predicted change in the virtual network function demand;
adjusting the physical CPU core of the node to the target clock speed corresponding to the predicted change in the virtual network function demand for the future workload period, wherein adjusting the physical CPU core of the node is coordinated to a latency; and
calculating the latency, wherein the latency is based on:
an adjustment delay associated with changing a clock speed of the physical CPU core from an initial clock speed to the target clock speed, and
a network delay.

2. The method of claim 1, further comprising:
collecting the historical workload data.

3. The method of claim 2, wherein the historical workload data is based on a time period.

4. The method of claim 3, wherein the time period is a date and time.

5. The method of claim 1, further comprising:
comparing a recent virtual network function demand to the historical workload data to determine a difference between the recent virtual network function demand and the historical workload data,
wherein predicting the change in virtual network function demand is further based on the difference.

6. The method of claim 5, wherein the comparison is based on a date or a time.

7. The method of claim 5, wherein the comparison is based on a usage pattern.

8. The method of claim 5, wherein the comparison identifies an anomalous event.

9. A computer readable storage medium storing computer executable instructions that when executed by a computing device cause said computing device to effectuate operations comprising:
predicting, based on historical workload data, a future demand during a future workload interval, wherein the future demand supports a virtual network function or container, and wherein the future demand is met by a server;

determining a target clock speed of at least one central processing unit (CPU) core corresponding to the future demand, wherein the at least one CPU core is within a processor in the server;

causing the at least one CPU core to adjust to the target clock speed corresponding to the future demand for the future workload interval; and determining a target clock speed of at least one hyper-thread of a central processing unit (CPU) core corresponding to the future demand, wherein two or more hyper threads are supported by the at least one CPU core corresponding to the future demand.

10. The computer readable storage medium of claim 9, the operations further comprising grouping cores or threads for common scaling.

11. A computer readable storage medium storing computer executable instructions that when executed by a computing device cause said computing device to effectuate operations comprising:

predicting, based on historical workload data, a predicted change in virtual network function demand during a future workload period, wherein the virtual network function is supported by a node;

determining a target clock speed of a physical central processing unit (CPU) core in the node corresponding to the predicted change in the virtual network function demand;

adjusting the physical CPU core of the node to the target clock speed corresponding to the predicted change in the virtual network function demand for the future workload period;

comparing a recent virtual network function demand to the historical workload data to determine a difference between the recent virtual network function demand and the historical workload data, wherein predicting the change in virtual network function demand is further based on the difference, and wherein the comparison identifies an anomalous event.

12. The computer readable storage medium of claim 11, wherein adjusting the physical CPU core of the node is coordinated to a latency.

13. The computer readable storage medium of claim 12, further comprising:

calculating the latency, wherein the latency is based on an adjustment delay associated with changing a clock speed of the physical CPU core from an initial clock speed to the target clock speed.

14. The computer readable storage medium of claim 13, wherein the latency is based on a network delay.

15. The computer readable storage medium of claim 11, further comprising:

collecting the historical workload data.

16. The computer readable storage medium of claim 15, wherein the historical workload data is based on a time period.

17. The computer readable storage medium of claim 16, wherein the time period is a date and time.

18. The computer readable storage medium of claim 11, wherein the comparison is based on a date or a time.

19. The computer readable storage medium of claim 11, wherein the comparison is based on a usage pattern.

* * * * *